April 4, 1944.  R. S. HOPKINS  2,346,074
FILM HANDLING APPARATUS
Filed April 28, 1942  2 Sheets-Sheet 1
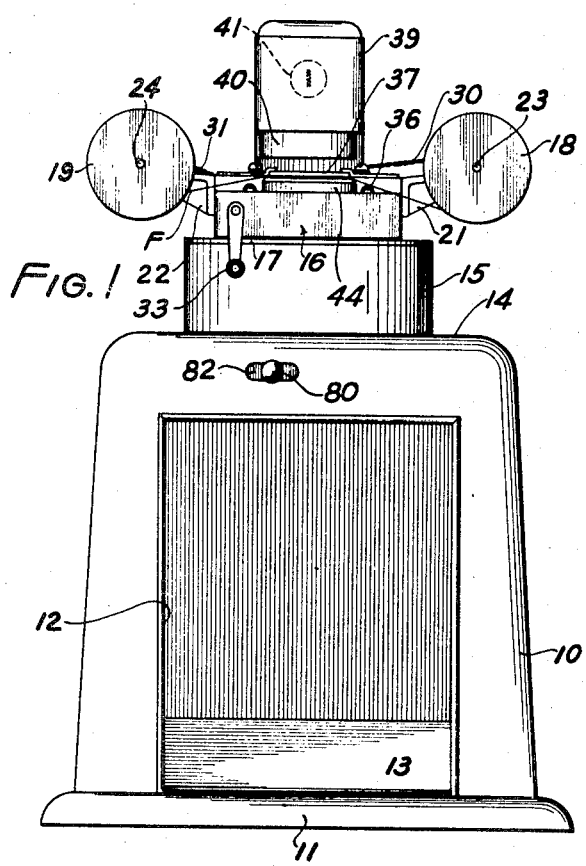
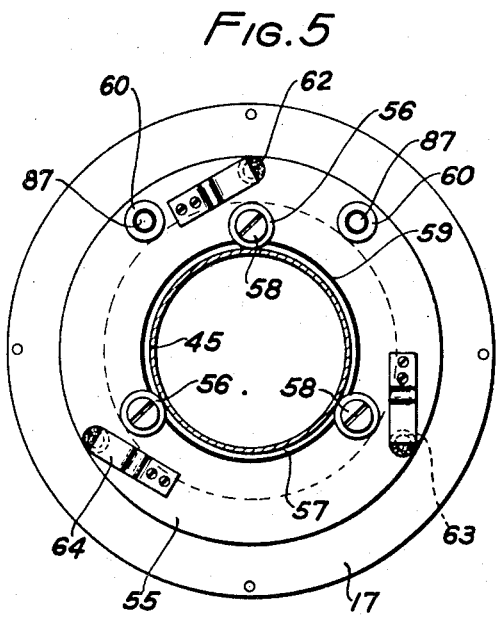
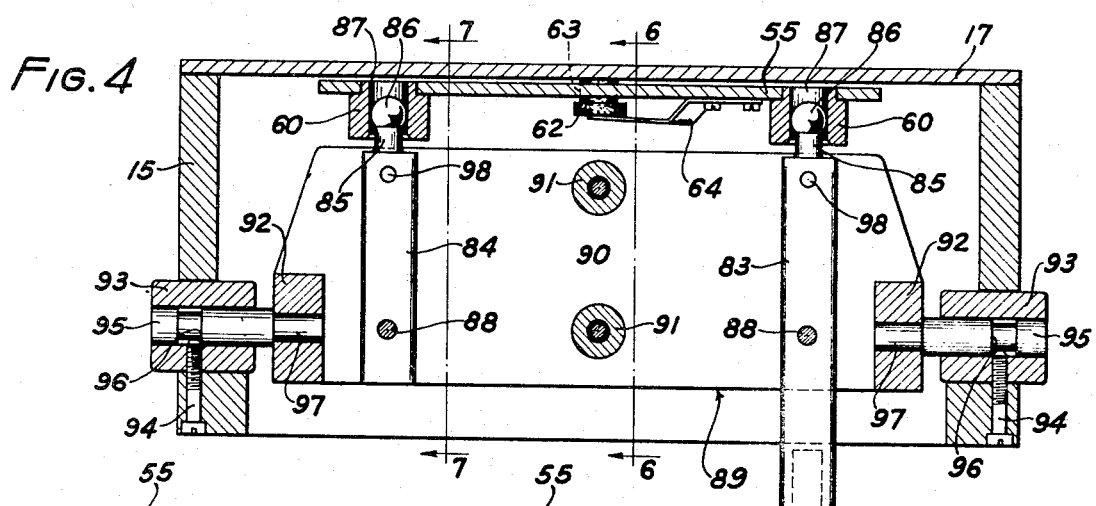
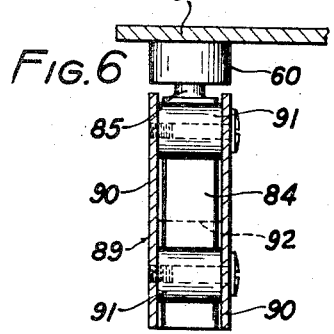
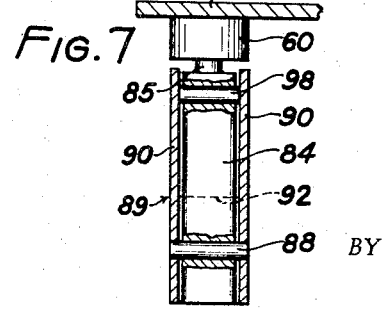
Roy S. Hopkins
INVENTOR
BY
ATTORNEYS April 4, 1944.   R. S. HOPKINS   2,346,074
FILM HANDLING APPARATUS
Filed April 28, 1942    2 Sheets-Sheet 2

Roy S. Hopkins
INVENTOR
BY
ATTORNEYS

Patented Apr. 4, 1944

2,346,074

UNITED STATES PATENT OFFICE 2,346,074

FILM HANDLING APPARATUS

Roy S. Hopkins, Rochester, N. Y., assignor to Eastman Kodak Company, Rochester, N. Y., a corporation of New Jersey Application April 28, 1942, Serial No. 440,807

10 Claims. (Cl. 88—24)

The present invention relates to film handling apparatus and more particularly to a mechanism for imparting a scanning movement to a film strip with respect to an observation position.

The primary object of the present invention is to provide a support for a film handling apparatus which can be moved with respect to an observation position for scanning only a film strip which is in position for projecting.

Another object is to provide a mechanism whereby the support carrying the film strip can be rotated independently with respect to the casing of the apparatus.

And yet another object is to provide a mechanism which will permit a two-dimensional movement of the support with respect to the observation position.

A further object is to provide a mechanism which is pivotably connected to the casing about one axis and pivotably connected to the support about another axis whereby a two-dimensional movement of the support is obtained and which is entirely enclosed in the casing.

And a still further object is to provide a mechanism for moving the support carrying the film strip which can be easily operated by a handle extending outside of the casing near the operator or the observation position.

Further objects and advantages will be suggested to those skilled in the art by the description which follows:

The above and other objects are embodied in a film handling apparatus having a casing which has an observation position for the film being projected, a screen located near one end of the casing and a projection system carried by the casing including a light source. A head for supporting the film strip is movably mounted on the casing and has fixed thereto a plate member which permits rotation of the head and film strip. A pair of spaced plates are pivoted to the casing and pivotably connected to a pair of posts which engage the aforementioned plate member, one of the posts being connected to an operating handle extending to the outside of the casing and movement of which will impart a two-dimensional movement to the head for a scanning movement of the film strip with respect to the observation position.

Reference is hereby made to the accompanying drawings wherein like reference characters designate similar parts and wherein:

Fig. 1 is a front elevation of the mechanism of the invention as applied to a projector;

Fig. 4 is a sectional view taken on the line 4—4 of Fig. 3 showing the mechanism for obtaining a two-dimensional movement of the head;

Fig. 5 is a detail bottom view of the plate member showing the arrangement for mounting it on the head;

Fig. 6 is a detail sectional view taken on the line 6—6 of Fig. 4; and

Fig. 7 is a detail sectional view, similar to Fig. 6, taken on the line 7—7 of Fig. 4.

Figure 2:
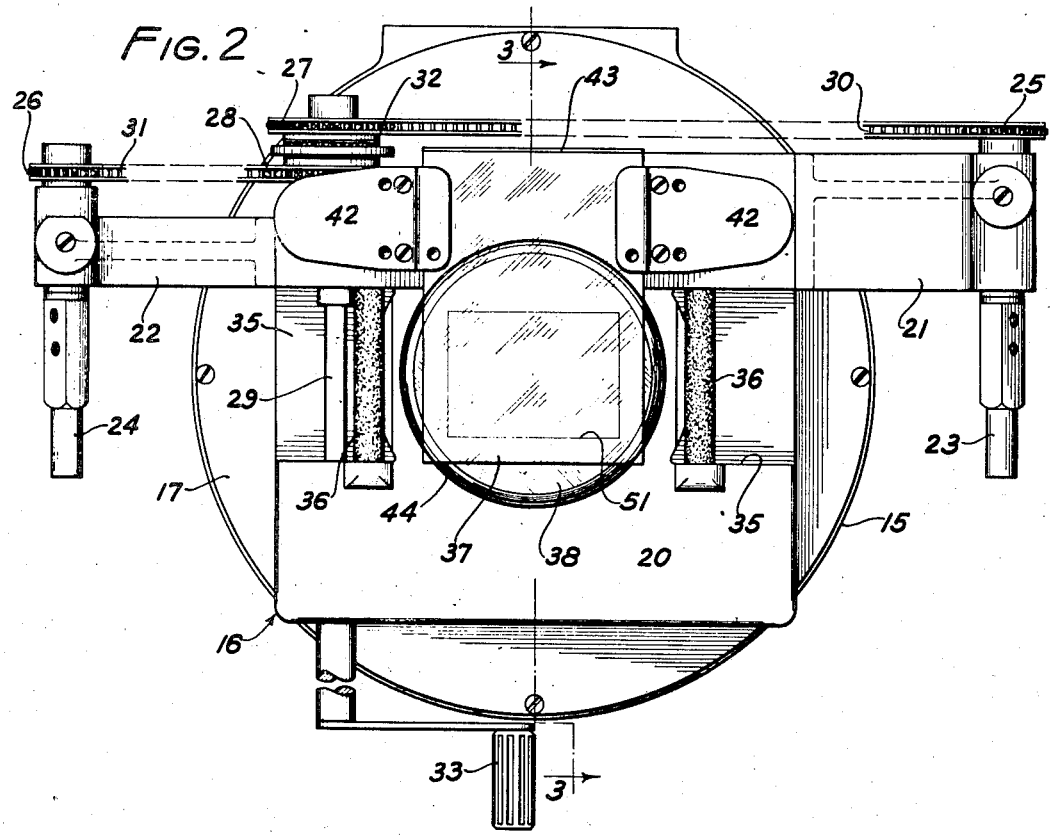
Fig. 2 is a plan view of head of the projector with certain parts omitted for clarity.

In a projection system where the magnification is such that only a portion of the projected image can be observed on the screen, it is necessary to provide a means for scanning the film strip by shifting either the projection system with respect to the film strip or the film strip with respect to the projection system in order to be able to view all parts of the film frame being projected. I have chosen, in the present embodiment of my invention, to use the latter method because the film strip can be more easily maintained in focus and must be capable of being rotated in the event that certain images do not project an upright image. This method also allows the operator to shift the film strip while observing the projected image. A further advantage is that the arrangement for moving the film strip is entirely enclosed within the casing with the exception of the operating handle, which extends outside of the casing directly over the observation position occupied by the operator and also permits the use of a smaller casing.

In the illustrated embodiment of the invention, the film handling apparatus comprises a casing 10 on a base member 11, the casing 10 being provided with an opening 12 for viewing the image projected on the screen 13. The screen 13 may be mounted in the casing 10 at an angle to the horizontal to facilitate viewing the projected image. The casing 10 has a top wall 14 to which a cylindrical member 15 is detachably fastened. The film supporting means, indicated broadly by the numeral 16, is mounted on a cover 17 on the member 15, in a manner to be described later, and carries the supply reel 18 and the take-up reel 19 for the film F.

The film supporting means 16 comprises a head 20 which carries the brackets 21 and 22 in which are mounted the shafts 23 and 24 for the supply reel 18 and the take-up reel 19. The sprockets 25 and 26 are mounted on the shafts 23 and 24 and are connected to the sprockets 27 and 28 on the shaft 29 respectively by the chains 30 and 31. The shaft 29 is provided with a clutch, generally indicated by the numeral 32, and a handle 33 so that as the handle 33 is turned in a clockwise direction with respect to Fig. 1, the shaft 24 will be positively driven as a take-up and the supply shaft 23 will turn freely and when the handle 33 is turned in a counter-clockwise direction, the shaft 23 will be positively driven as a take-up and the shaft 24 will turn freely. The detail structure of clutch 32 is clearly set forth in my Patent 2,279,463, granted April 14, 1942.

Figure 3:
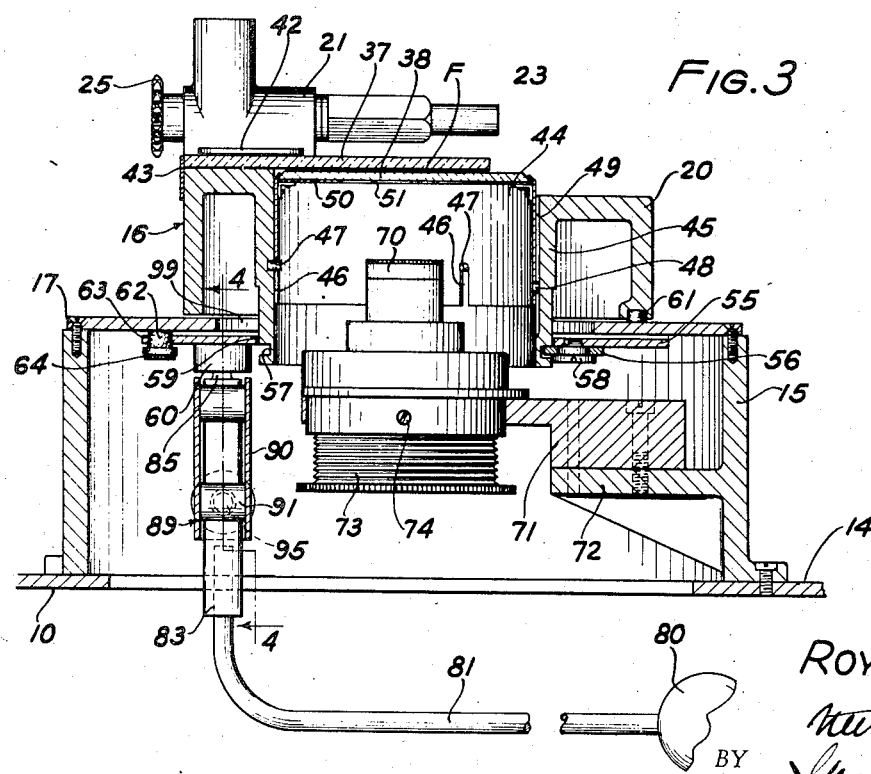
Fig. 3 is a view taken on the line 3—3 of Fig. 2.

The head 20 is provided with two cut out portions 35 to eliminate the possibility of scratching the film as it is wound from one reel to the other. The film F passes over the rubber rollers 36 and is clamped in a projecting position by the glass plate 37 and the glass plate 38 located between the rubber rollers 36 and under the lamp house 39 which carries the condenser unit 40 and a light source 41. The glass plate 37 is held in position by the members 42 which are spring mounted on the head 20 and is limited in its rearward movement by the retaining plate 43. The glass plate 38 is of circular shape and is carried by the cylindrical sleeve 44 which fits into a cylindrical extension 45 forming a part of the head 20, as shown in Fig. 3. While not shown, the glass plates 37 and 38 may be separated on the first movement of the handle 33 to release the film, as shown and described in my Patent 2,008,982, granted July 23, 1935, for a Device for producing enlarged images. The sleeve 44 is provided with a series of axial slots 46 which engage the pins 47 fixed in the extension 45 and is properly positioned by the pin 48 which engages the keyway 49 in the extension 45. A masking plate 50 is mounted in the sleeve 44 and is provided with an aperture 51 corresponding in size and shape to that portion of the film to be projected or viewed.

A plate member 55 is mounted on the extension 45 by the washers 56 which engage a peripheral groove 57 near the end of the extension 45, and the washers 56 are held in position by the threaded studs 58, as shown in Fig. 5. The plate 55 is provided with an aperture 59 which is larger than the diameter of the extension 45 to permit easy assembling and has fixed thereto two collars 60, the purpose of which will be described hereinafter. To facilitate movement of the head 20 and the plate member 55 on the plate 17, graphite or fiber plugs 61 are mounted in the head 20 and similar plugs 62 are inserted in the holes 63 provided in the plate 55 and held in position by the springs 64, as shown in Figs. 3, 4 and 5.

The projection system 70 is mounted on a bracket 71 which is secured to the shelf 72 forming a part of member 15. The threaded sleeve 73 may be rotated to properly focus the projected image on the screen 13 when the apparatus is assembled and then locked in position by the set screw 74.

A manually movable means for moving the supporting means with respect to the observation position or the projection system comprises a knob 80 which is outside of the casing 10 and secured to a rod 81 extending through the opening 82 in the casing 10 and also includes posts 83 and 84 which are inside the member 15. The posts 83 and 84 are mounted on pivots 88 between plates 90, differ only in length and have a neck portion 85 and a spherical portion 86 at one end thereof, as shown in Fig. 4. The spherical portions 86 engage and may slide within the openings 87 in the collars 60 fixed to the plate member 55 to form a pivotal and slidable connection therebetween.

An intermediate means 89 comprises a pair of spaced plates 90 which are maintained in a spaced relationship by the spacers 91 and the blocks 92, as best shown in Figs. 4 and 6. The member 15 supports cylindrical bearings 93, which are held in position by the screws 94, for the studs 95. The studs 95 are provided with a peripheral grooves 96 which are engaged by the screws 94 to lock the studs in position and have a reduced portion 97 that engage the blocks 92 to provide a pivotable connection for the plates 90 and the posts 83 and 84. In the present embodiment of the invention, the axes of pivots 88 for the posts 83 and 84 and of the studs 95 for the plates 90 lie in the same plane, however, it is to be understood that such axes may lie in different planes with respect to one another depending on the movement required. In order to prevent the posts 83 and 84 from binding against the plates 90, the pins 98 are provided, as shown in Fig. 7.

The operation of the above described apparatus is as follows: The film F from the reel 18 is threaded over the rollers 36 and between the glass plates 37 and 38 and secured to the other reel 19, and the handle 33 may be turned in a clockwise direction to wind the film onto the reel 19 until the desired frame to be viewed is projected upon the screen 13 in the casing 10. The film will then be held between the glass plates 37 and 38, but due to the magnification of the projection system, the entire frame will not be projected upon the screen. Movement of the knob 80 toward or away from the casing 10 will cause the intermediate means including the posts 83 and 84 and the plates 90 to be pivoted about the studs 95 and due to the connection between the posts 83 and 84 and the collars 60, the plate member 55 will move the head 20 carrying the film F toward the front or the back of the casing 10 with respect to the projection system 70.

If the knob 80 is moved to the right or the left, from the position shown in Fig. 1, the plates 90 will remain stationary and the posts 83 and 84 will turn about the pivots 88 to move the plate member 55 and the head 20 to the left or right with respect to the projection system 70. The knob 80 may be moved in two directions simultaneously for diagonal movement of the head 20 with respect to the projection or observation position. For instance, if the knob 80 is moved toward the casing 10 and at the same time moved to the right, the plates 90 will pivot about the studs 95 and the posts 83 and 84 will turn about the pivots 88 so that the plate member 55 and the head 20 will move toward the front of the casing 10 and to the left with respect to the projection system 70. In a like manner, the head 20 will be moved toward the back of the casing 10 and to the right, if the knob 80 is pulled outwardly and moved to the left. It can be readily appreciated that a two-dimensional movement of the head 20 can be obtained with respect to the projection system 70 with the above construction so that a larger magnification of only a portion of the film frame can be obtained, and a smaller cabinet can be used. The opening 99 in the cover 17 is sufficient to allow the maximum movement necessary to cover the entire film frame. The fiber plugs 61 and 62 support the head 20 and the plate member 55 with respect to the cover 17, and the effort necessary to move the parts is greatly reduced due to the lessening of the friction between the parts and the cover 17.

As used herein to describe and define the movements of film supporting means 16, head 20 and/or plate 55 thereof, the term "two-dimensional" includes movements in both dimensions simultaneously.

When the images projected are not readable due to not being projected in an upright position, the head 20 may be turned on the cover 17 with respect to the plate member 55, which is held in position by the connection between the posts 83 and 84 and the collars 60, until the image assumes an upright position on the screen 13. The washers 56 that are in engagement with the groove 57 in the extension 45 maintain the head 20 and the film F thereon in proper relation to the projection system 70.

Other advantages of the film handling apparatus disclosed herein will be obvious to those skilled in the art and modification of the various elements disclosed to obtain the same advantages will also be apparent. Therefore, the present disclosure is to be construed only in an illustrative sense.

Having now particularly described my invention, what I desire to secure by Letters Patent of the United States and what I claim is:

1. In a mechanism for scanning movement of a film strip with respect to an observation position, the combination comprising a casing having an observation position, a supporting means movably mounted on said casing and for two-dimensional movement of a film strip with respect to said observation position, and an intermediate means including two members pivotally connected to each other about one axis, one of said members being pivotally connected to said casing about another axis which is transverse to said one axis, and the other of said members being operatively connected to said support for obtaining a two-dimensional movement of said film strip with respect to said observation position.

2. In a mechanism for scanning movement of a film strip with respect to an observation position, the combination comprising a casing having an observation position, a supporting means movably mounted on said casing and for two-dimensional movement of a film strip with respect to said observation position, an intermediate means including two members pivotally connected to each other about one axis, one of said members being pivotally connected to said casing about another axis which is transverse to said one axis and the other of said members being operatively connected to said support for obtaining a two-dimensional movement of said film strip with respect to said observation position, and a manually movable member carried by said other member of said intermediate means.

3. In a mechanism for scanning movement of a film strip with respect to an observation position, the combination comprising a casing including a hollow cap member and having an observation position, a supporting means movably mounted on said cap member and for two-dimensional movement of a film strip with respect to said observation position, a manually movable member operatively connected within said cap member to said supporting means and for moving the same, and an intermediate means also within said cap member, pivotably connected to said casing about one axis and also pivotably connected to said manually movable member about another axis which is transverse to said one axis for obtaining a two-dimensional movement of said film strip with respect to said projection system.

4. In a mechanism for scanning movement of a film strip with respect to an observation position, the combination comprising a casing having an observation position, a supporting means movably mounted for two-dimensional movement of a film strip with respect to said observation position and including a plate member operatively connected to said casing and for permitting independent rotation of said supporting means, a manually movable member operatively connected to said plate member and for moving said plate member and supporting means, and an intermediate means pivotably connected to said casing about one axis and also pivotably supporting said manually movable member about another axis which is transverse to said one axis for obtaining two-dimensional movement of said film strip with respect to said observation position.

5. In a mechanism for scanning movement of a film strip with respect to an observation position, the combination comprising a casing having an observation position, a supporting means movably mounted on said casing and for supporting a film strip with respect to said observation position, a plate member secured to said supporting means for permitting independent rotation of said supporting means, including a pair of collars fixed thereto, a manually movable member pivotably connected to said plate member and for moving said plate member and supporting means, including a pair of posts having spherical portions adapted to engage said collars and an operating handle connected to one of said posts, and an intermediate means pivotably connected to said casing about one axis and also pivotably connected to said posts about another axis which is transverse to said one axis for obtaining two-dimensional movement of said film strip with respect to said observation position.

6. In a mechanism for scanning movement of a film strip with respect to an observation position, the combination comprising a casing having an observation position, a supporting means movably mounted on said casing and for supporting a film strip with respect to said observation position, a plate member secured to said supporting means for permitting independent rotation of said supporting means, including a pair of collars fixed thereto, a manually movable member pivotably connected to said plate member and for moving said plate member and supporting means, including a pair of posts having spherical portions adapted to engage said collars and an operating handle connected to one of said posts, and an intermediate means, including a pair of spaced plates pivotably connected to said casing about one axis and pivotably connected to said posts about another axis which is transverse to said one axis for obtaining two-dimensional movement of said film strip with respect to said observation position.

7. In a mechanism for scanning movement of a film strip with respect to an observation position, the combination comprising a casing having an observation position, a supporting means movably mounted on said casing and for two-dimensional movement of a film strip with respect to said observation position, a manually movable member operatively connected to said supporting means and for moving the same, an intermediate means pivotably connected to said casing about one axis and also pivotably supporting said manually movable member about another axis which is transverse to said one axis for obtaining a two-dimensional movement of said film strip with respect to said projection system, and anti-friction means between said supporting means and said casing to provide ease of movement when said supporting means is moved by said manually movable member.

8. In a mechanism for scanning movement of a film strip with respect to an observation position, the combination comprising a casing having an observation position, a supporting means movably mounted on said casing and for supporting a film strip with respect to said observation position including reel supports for said film strip and means for holding said film strip flat while in the observation position, a plate member secured to said supporting means for permitting independent rotation of said supporting means, including a pair of collars fixed thereto, a manually movable member pivotably connected to said plate member and for moving said plate member and said supporting means, including a pair of posts having spherical portions adapted to engage said collars and an operating handle connected to one of said posts, an intermediate means, including a pair of spaced plates pivotably connected to said casing about one axis and pivotably connected to said posts about another axis which is transverse to said one axis for obtaining two-dimensional movement of said film strip with respect to said observation position, and means carried by said supporting means and plate member for engaging said casing to provide ease of movement when said supporting means is moved independently and when said supporting means and plate member are moved as a unit by said operating handle.

9. In a mechanism for scanning movement of a film strip with respect to an observation position, the combination comprising a casing having an observation position, a projection system carried by said casing, a screen mounted in said casing, a supporting means movably mounted on said casing and for supporting a film strip with respect to said projection system, including reel supports for said film strip and means for holding said film strip flat while in the observation position, a plate member secured to said supporting means for permitting independent rotation of said supporting means, including a pair of collars fixed thereto, a manually movable member pivotably connected to said plate member and for moving said plate member and said supporting means, including a pair of posts having spherical portions adapted to engage said collars and an operating handle connected to one of said posts, an intermediate means, including a pair of spaced plates pivotably connected to said casing about one axis and pivotably connected to said posts about another axis which is transverse to said one axis for obtaining two-dimensional movement of said film strip with respect to said observation position, and means carried by said supporting means and plate member for engaging said casing to provide ease of movement, when said supporting means is moved independently and when said supporting means and plate member are moved as a unit by said operating handle.

10. In a film handling apparatus, the combination with a casing including a hollow cap member and having an observation position, and a projection system carried by said casing and including an element within said cap member, of a supporting means movably mounted on said cap member and for two-dimensional movement of a film strip with respect to said projection system, a manually movable member operatively connected within said cap member to said supporting means and for moving the same, and an intermediate means also within said member pivotably connected to said casing about one axis and also pivotably supporting said manually movable member about another axis which is transverse to said one axis for obtaining a two-dimensional movement for scanning said film strip with respect to said observation position.

ROY S. HOPKINS.